United States Patent
Rosaen

[15] 3,637,083
[45] Jan. 25, 1972

[54] FLUID SYSTEM WITH SELF-CLEANING FILTER

[72] Inventor: Nils O. Rosaen, 3774 Quarton Road, Bloomfield Hills, Mich. 48013

[22] Filed: Apr. 1, 1970

[21] Appl. No.: 31,455

Related U.S. Application Data

[60] Division of Ser. No. 713,018, Mar. 14, 1968, Pat. No. 3,542,197, which is a continuation-in-part of Ser. No. 539,863, Apr. 4, 1966, Pat. No. 3,425,557, and a continuation-in-part of 661,968, Aug. 21, 1967, Pat. No. 3,425,558.

[52] U.S. Cl. .......................................... 210/497, 137/516.25
[51] Int. Cl. ................................... B01d 35/02, B01d 33/40
[58] Field of Search .......................... 210/497, 493, 340, 341; 137/259, 262, 265, 516.25

[56] References Cited

UNITED STATES PATENTS

| 2,019,169 | 10/1935 | Backlund | 210/341 |
| 3,469,707 | 9/1969 | Humbert, Jr. et al. | 210/493 X |

*Primary Examiner*—Frank A. Spear, Jr.
*Attorney*—Hauke, Gifford & Patalidis

[57] ABSTRACT

A partially cylindrical filter element for use in two chambers, at different pressures, and separated by a partition having pressure-responsive vanes.

5 Claims, 10 Drawing Figures

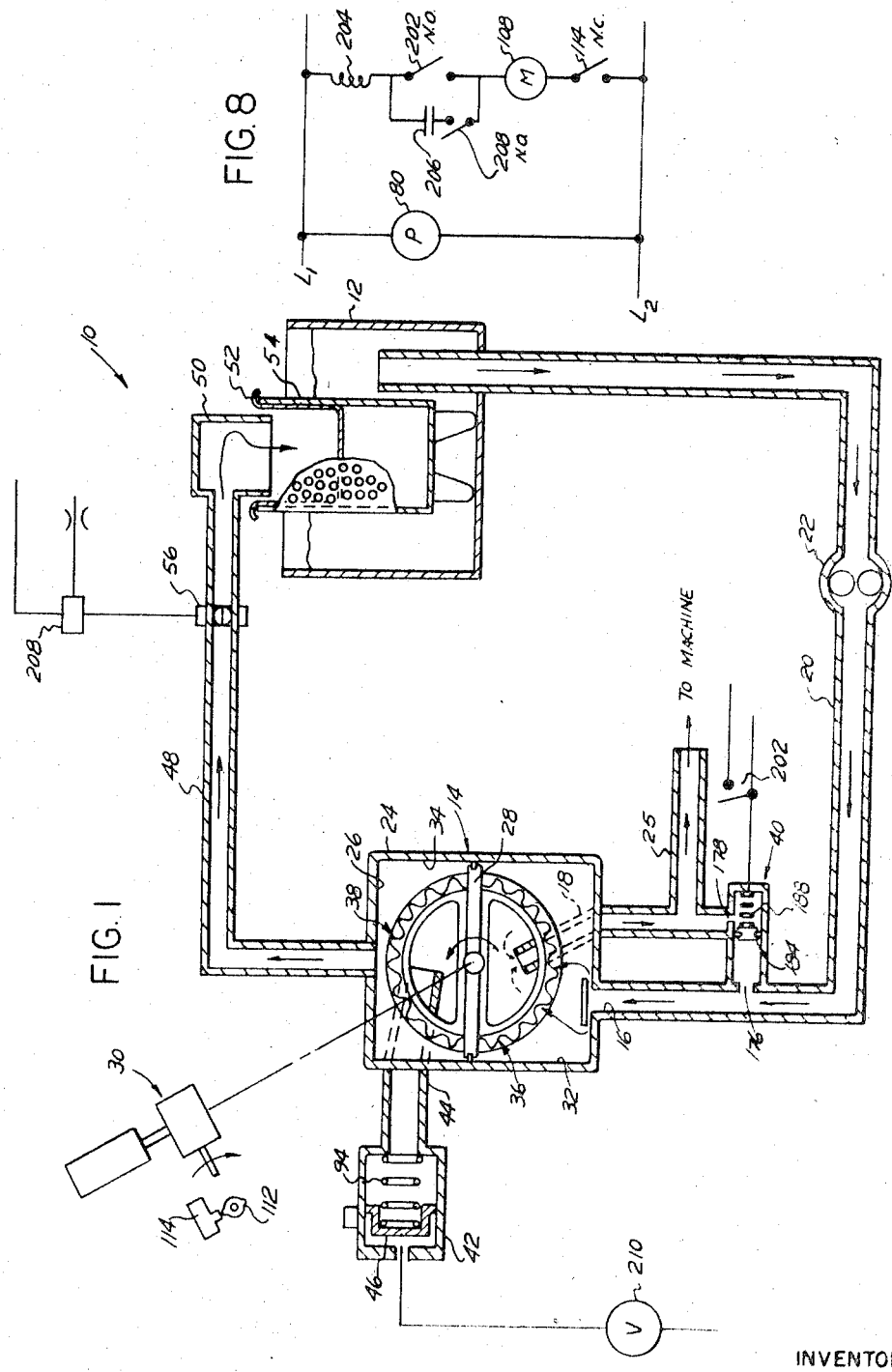

INVENTOR
NILS O. ROSAEN

Hauke, Gifford & Patalidis
ATTORNEYS

INVENTOR
NILS O. ROSAEN

Hauke, Gifford & Patalidis
ATTORNEYS

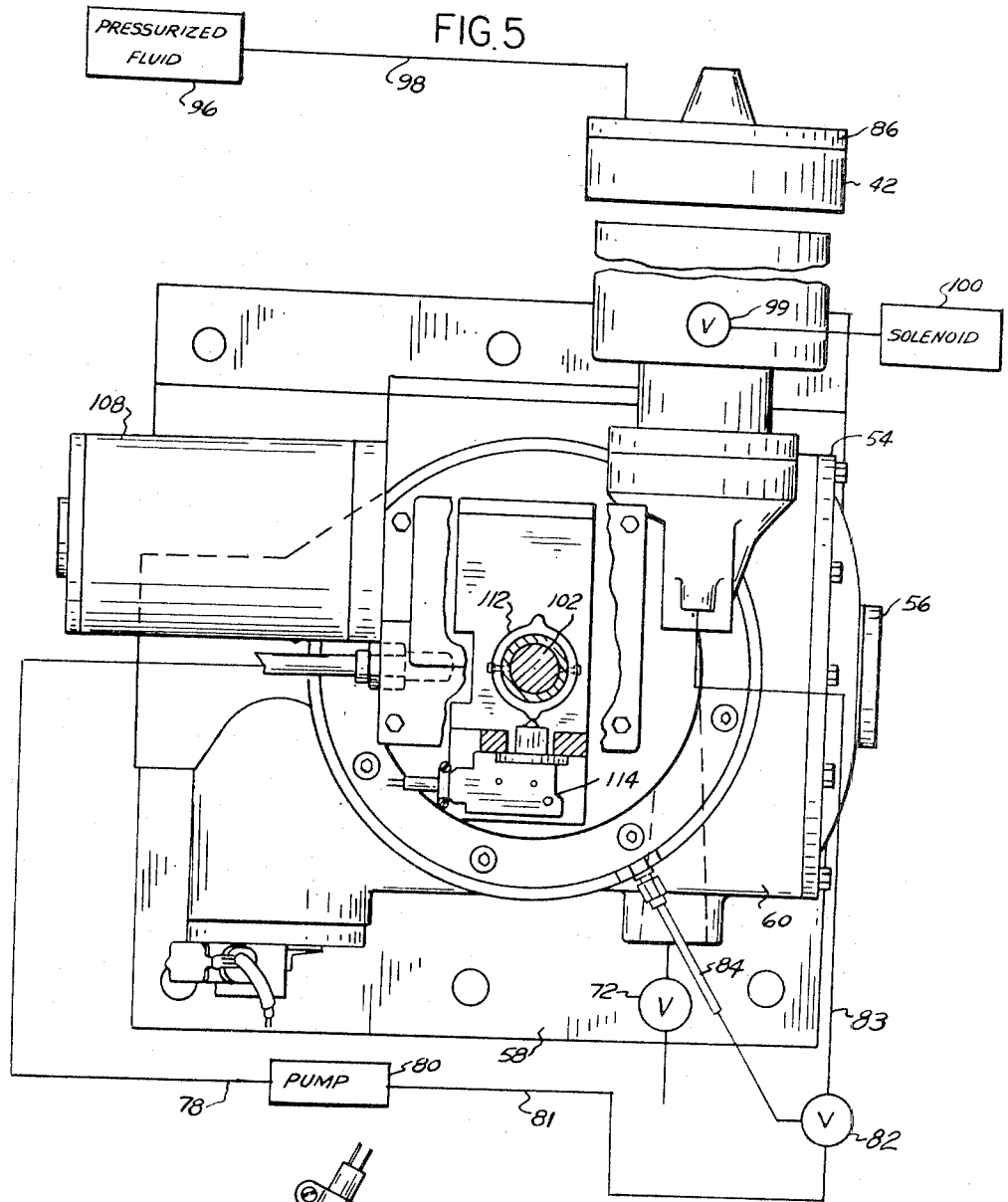
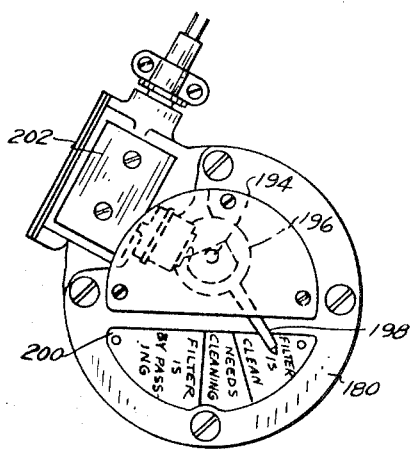

FLUID SYSTEM WITH SELF-CLEANING FILTER

CROSS-REFERENCE TO RELATED APPLICATION

This application is a division Ser. No. 713,018, filed Mar. 14, 1968, now U.S. Pat. No. 3,542,197, which is a continuation-in-part of my application Ser. No. 539,863 filed Apr. 4, 1966, now U.S. Pat. No. 3,425,557 and application Ser. No. 661,968 filed Aug. 21, 1967, now U.S. Pat. No. 3,425,558.

BACKGROUND OF THE INVENTION

In my aforementioned patents, a novel self-cleaning filter apparatus disclosed in which the internal chamber of a filter housing is subdivided by a rotatable partition member into a pair of substantially fluidly separated chamber sections including a first chamber section having an inlet and an outlet for receiving fluid to be filtered and for the discharge of filtered fluid and a second chamber section substantially fluidly separated from the first subchamber. A pair of filter elements mounted on the partition are arranged with one of the filter elements disposed in the first chamber section and the second filter element disposed in the second chamber section when the partition is in one of its rotated positions. The element in the first chamber performs the filtering function while means in the second chamber section produce a fluid surge through the element in the second chamber section in order to clean the second filter element. Means are further disclosed for automatically rotating the partition to exchange the position of the two filter elements when the filter element in the first chamber becomes clogged.

The broad purpose of the present invention is to provide a number of improvements in the aforementioned self-cleaning filter apparatus and to disclose a fluid system in which the apparatus is incorporated.

SUMMARY

The preferred embodiment of the present invention forms the cooling system for a machine tool and includes a coolant reservoir from which the fluid is pumped to a filter device for cleaning. The clean fluid is then delivered to the machine and returned to the reservoir. The preferred filter device comprises a pair of semicylindrical filter elements each releasably mounted on opposite sides of a planar partition member. The partition is rotatably mounted in an internal chamber in the housing and is movable between a pair of rotated positions 180° apart. In either of the rotated positions the partition divides the internal chamber into a pair of chamber sections including a filtering chamber and a cleaning chamber with one of the filter elements being disposed in the filtering chamber to separate foreign matter from the fluid as it flows through the filtering chamber and the second filter element being disposed in the cleaning chamber. A pressure chamber is fluidly connected with the cleaning chamber and a piston disposed in the pressure chamber is operative to produce a backwash flow through the filter element disposed in the cleaning chamber after the filter element has been rotated from the filtering chamber in a clogged condition.

It is essential that the fluid chambers be fluidly separated when the partition is in one of its rotated positions. To achieve this fluid separation, the partition carries a pair of vane elements along its side edges which are loosely mounted and pressure balanced by a novel ball valve construction so that as the partition rotates the vanes tilt in such a manner as to be self cleaning.

The cleaning chamber is fluidly connected with the coolant reservoir so that the backwash fluid flows through the filter element and then toward the reservoir. To prevent pressure fluctuation in the system when the partition is rotating and which might be caused because of the open center construction of the internal chamber, a valve in the conduit between the cleaning chamber and the reservoir automatically closes when the partition is in an intermediate position. Thus there is a continuous uninterrupted fluid flow through the device when the two filter elements are being exchanged.

In order to collect foreign matter removed from the filter in the cleaning chamber, the conduit from the cleaning chamber to the reservoir discharges through a felt bag which separates the foreign matter in the backwash fluid. Thus, the backwash fluid is recovered in a fairly clean condition.

The filter housing has a removable side cover which permits the filter elements to be individually removed in the form of a cartridge for ease of maintenance and replaceability.

Other advantages of the present invention will readily occur to one skilled in the art to which the invention pertains upon reference to the following detailed description.

DESCRIPTION OF THE DRAWINGS

The description refers to the accompanying drawings in which like reference characters refer to like parts through the several views and in which:

FIG. 1 is a schematic diagram of a fluid circuit illustrating the preferred embodiment of the invention;

FIG. 5 is an enlarged sectional view as seen along lines 5—5 of FIG. 2;

FIG. 6 is an enlarged view as seen along lines 6—6 of FIG. 4;

FIG. 8 is a schematic electrical circuit showing the preferred electrical system;

DESCRIPTION OF THE PREFERRED EMBODIMENT

Figure 7:
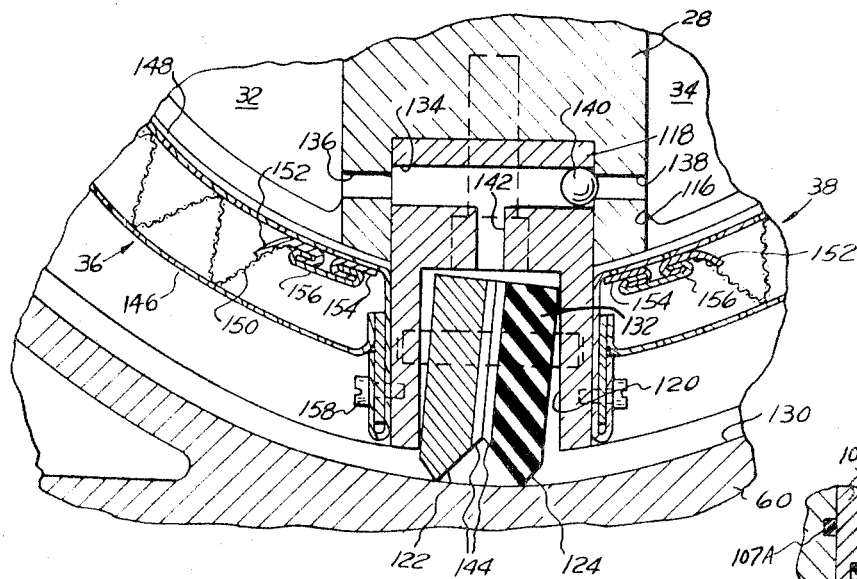
FIG. 7 shows an enlarged sectional view of the sealing vanes and their mounting arrangement.

Now referring to FIG. 1, the preferred fluid system 10 is employed for cycling a fluid cooling agent for a machine tool (not shown). The system comprises a reservoir 12 and a filter device generally indicated at 14. The filter device has an inlet 16 and an outlet 18. Conduit means 20 connect the reservoir 12 with the inlet 16 of the filtering device and pump means 22 in the conduit delivers fluid to be filtered to the inlet 16 of the filter device 14. The filtered fluid discharged from the filter device is delivered through a conduit 25 to the machine tool from which it is returned to the reservoir by return means (not shown).

The filter device 14 comprises housing means 24 having an internal chamber 26. A generally planar partition means 28 is rotatably mounted in the internal chamber 26 and intermittently rotated by drive means 30 between a pair of rotated positions 180° apart in which the partition means 28 subdivides the internal chamber 26 into a pair of chamber sections which will be referred to as a filtering chamber 32 and a cleaning chamber 34. A pair of generally semicylindrical filter cartridge elements 36 and 38 are mounted on opposite sides of the partition means 28 so that they collectively form a substantially cylindrical filter means. In each of the operative rotated positions of the partition means 28, one of the filter elements is disposed in the filtering chamber 32 and the second filter element is in the cleaning chamber 34 so that when the partition means 28 is rotated, the two filter elements 36 and 38 exchange their relative positions. The filter element in the filtering chamber 32 is disposed intermediate the inlet 16 and the outlet 18 so that fluid introduced into the filtering chamber 32 passes radially through the filter element and then flows through the outlet 18. As the filter element in the filtering chamber 32 assumes a clogged condition, it produces a pressure change in the system fluid. Sensing means generally indicated at 40 detect this pressure change and through suitable circuitry which will be subsequently described transmits a signal to drive means 30 which commences to rotate the clogged filter element out of the filtering chamber 32 into the cleaning chamber 34 and to rotate the clean filter element in the cleaning chamber 34 into the filtering chamber 32. This automatic exchange occurs without interrupting the continuity in the system fluid flow.

A pressure chamber 42 is fluidly connected by passage means 44 to the inner side of the filter element disposed in the cleaning chamber 34 and a piston 46 in the pressure chamber 42 is actuated after the clogged filter has been moved into the cleaning chamber 34 to produce a sudden pressure surge which causes a reverse fluid flow through the clogged filter element and removes the foreign matter collected on the outer surface of the element. The backwash fluid flow caused by the pressure surge is directed from the filter element to a conduit means 48 which delivers the backwash fluid toward the reservoir 12. A fluid decelerator 50 mounted at the end of the conduit 48 reduces the velocity of the backwash fluid before it is discharged into a felt bag 52 which separates the foreign matter in the backwash fluid. The felt bag 52 is supported in a perforated container 54 which is mounted within the reservoir 12.

A valve 56 in the conduit 48 is normally open during the backwash cycle and is automatically closed when the partition means 28 is in a position intermediate its two rotated positions with the filtering chamber 32 and the cleaning chamber 34 open to one another. Thus the pressure in the cleaning chamber 34 and the system is maintained until the partition means 28 has rotated to its alternate position.

Now referring to FIGS. 2–5, housing means 24 is mounted on a pedestal 58 and includes a housing member 60 in which the inlet 16 and the outlet 18 are formed and a top removable cover member 62 which is bolted on the side of the housing member 60 and upon separation from the housing member provides access to its internal components. The top cover member 62 also supports the drive means 30. A side cover member 64 is removably mounted on the side of the housing member 60 and provides access into the internal chamber 26 so that the filter elements can be individually removed from the chamber 26. The cover 64 has a central opening preferably closed by a transparent plate 66 which permits a visual observation of the interior of the housing 60. As can best be seen in FIG. 3, the housing member 60 is internally cored to form a sediment chamber 59 below the filter element 38 and on its inner side. This sediment chamber can be connected to a dump line provided with a suitable valve (not shown) for cleaning purposes. A second sediment chamber 61 is formed in the housing member 60 on the outer side of and below the filter element 38 in the cleaning chamber 34. The sediment chamber 61 is connected by the conduit 48 to the reservoir 12.

Figure 2:
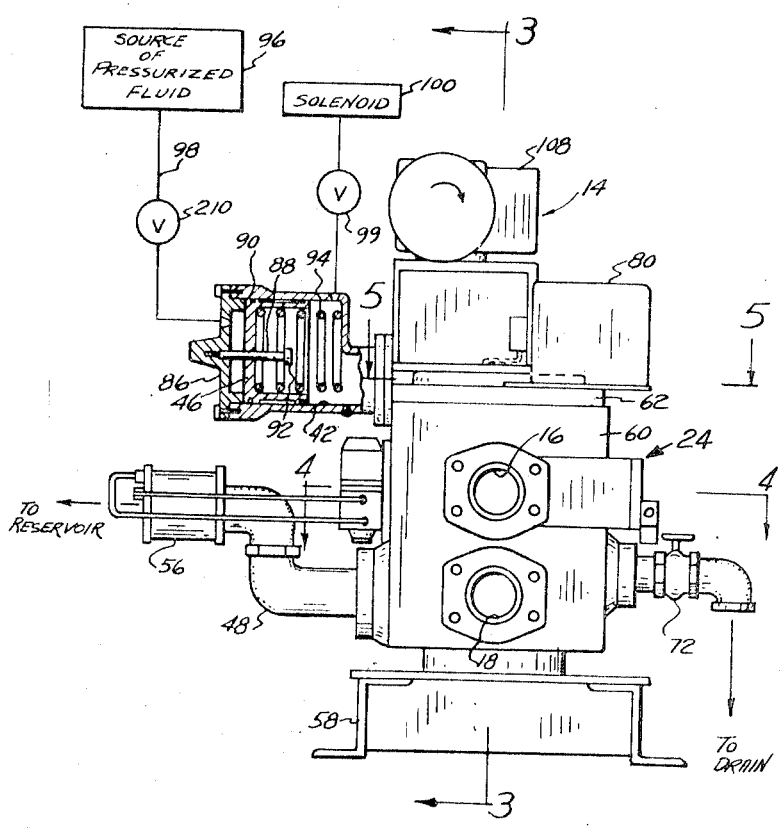
FIG. 2 is an elevational view of the preferred filter device with parts shown schematically and parts in section for purposes of description.

As seen in FIG. 2, a drain valve 72 connected to the opposite side of the sediment chamber 61 provides means for draining the fluid from within the housing member 60.

Figure 3:
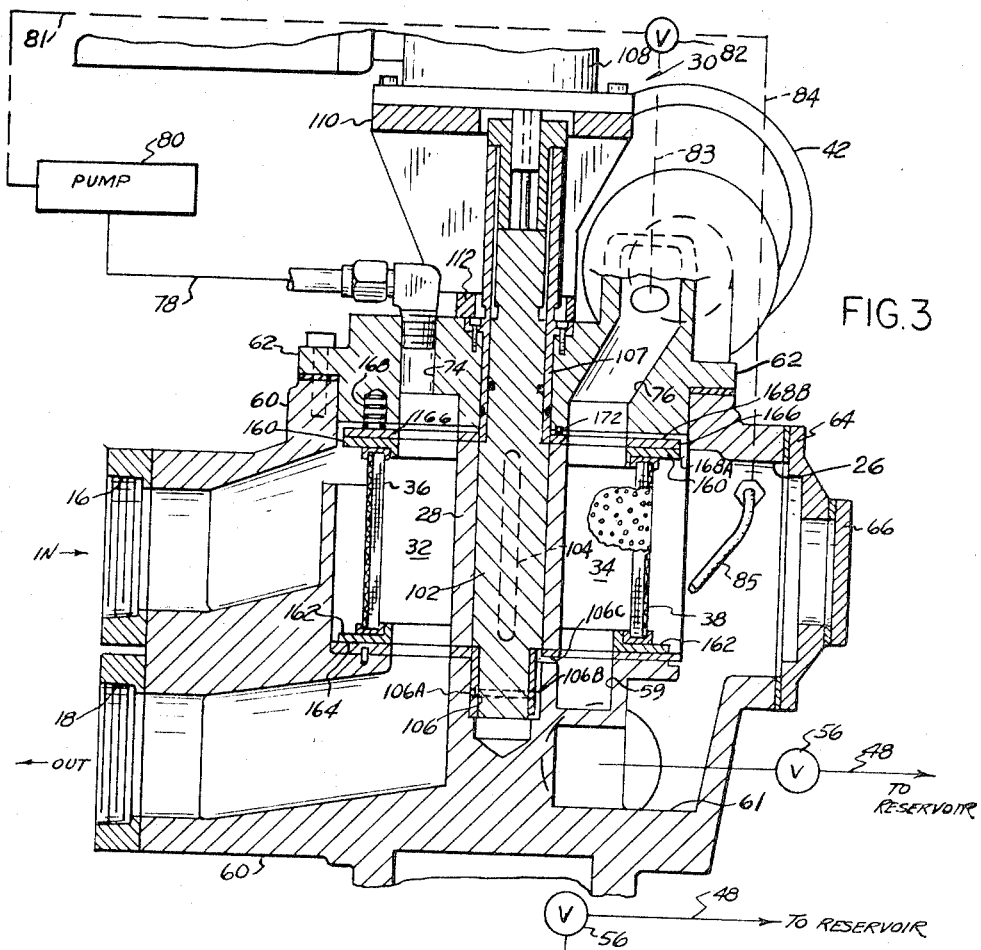
FIG. 3 is an enlarged sectional view as seen along lines 3—3 of FIG. 2.

Referring to FIG. 3, the cover 62 has a pair of passages 74 and 76. The passage 74 is in fluid communication with the inner side of the filter element disposed in the filtering chamber 32. The passage 76 provides a connection from the pressure chamber 42 to the inner side of the filter element disposed in the cleaning chamber 34.

A conduit 78 forms a fluid connection between a pump 80 and the chamber 32. The output of the pump 80 is through a conduit 81 to a valve 82 which alternately delivers clean fluid through a connection 83 to the pressure chamber or through a connection 84 to a nozzle 85 mounted in the cleaning chamber 34. As the clogged filter element is rotated into the cleaning chamber 34, the nozzle 85 delivers filtered fluid against its outer surface. When the partition 28 is in one of its rotated positions, the connection 83 provides means for filling the pressure chamber 42.

It is to be noted in FIG. 2 that the pressure chamber 42 is mounted above the cleaning chamber and is closed off by a cover member 86 which carries an inwardly directed guide rod 88 for guiding the piston 46 between its alternate within the pressure chamber 42. The piston 46 is movable between a retracted position wherein it abuts an annular shoulder 90 formed on the inner side of the cover 86 and an extended position wherein it abuts an enlarged portion 92 of the guide rod 88. A spring 94 disposed within the chamber 42 biases the piston 46 toward its retracted position. In response to a signal, pressurized fluid from a source 96 is introduced through a conduit 98 behind the piston 46 and urges the piston away from the cover 86 so that it produces a pressure wave traveling through the passage 76 toward the inner side of the filter element disposed in the cleaning chamber 34. As the pressure wave travels through the cleaning chamber 34 it removes foreign matter on the clogged filter element and delivers the foreign matter to the conduit 48.

Because the pressure chamber 42 is mounted above the cleaning chamber 34, any air carried in the fluid has a tendency to rise upwardly and accumulate in the pressure chamber. An air bleed valve 99 provides means for drawing off the accumulation of air and is an on-off valve controlled by a solenoid 100. The solenoid 100 is operated by suitable control means so that the valve 99 is opened in the air bleed position when the filter device is in operation, however when the device is not operating the solenoid 100 closes the valve 99 to prevent draining of the fluid from the pressure chamber 42.

Figure 4:
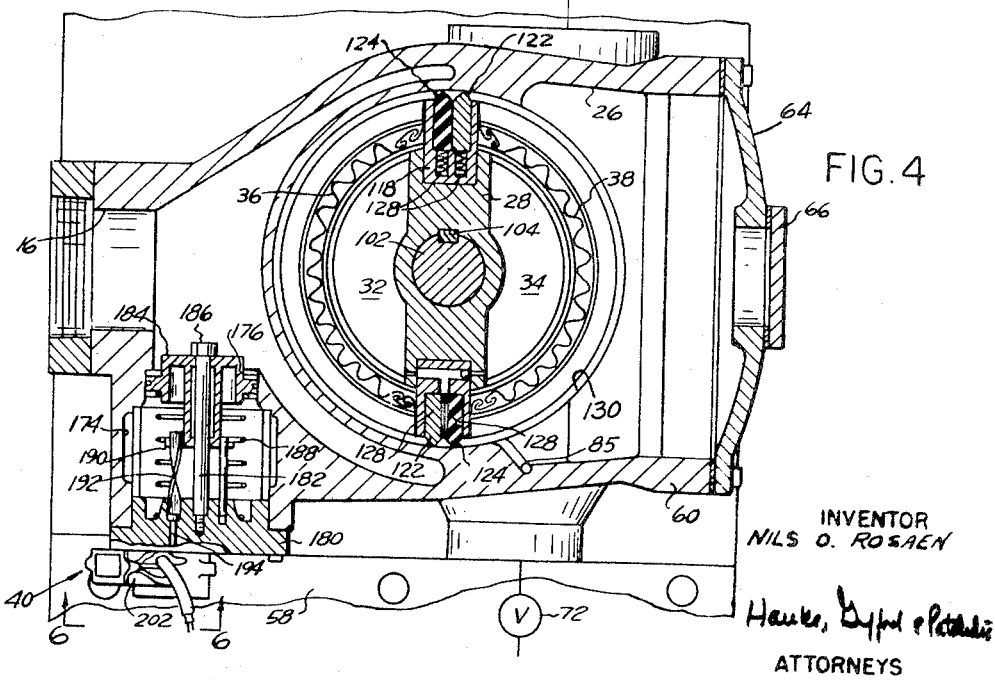
FIG. 4 is an enlarged sectional view as seen along lines 4—4 of FIG. 2.

Now referring to FIGS. 3, 4, and 5, the partition means 28 is mounted on a vertical drive shaft 102 by a key 104 for rotation within the internal chamber 26. The lower end of the shaft is journaled in a bushing 106 and its upper end is journaled in a bushing 107 in the cover 62. The lower bushing 106 has an annular groove 106A connected with an axial groove 106B on the cleaning chamber side of the partition means for collecting fluid leakage from the cleaning chamber 32 which travels down between the housing 60, the bushing 106 and the partition means 28. This leakage is delivered through an opening 106C to the sediment chamber 59. The upper end of the shaft 102 extends through the cover 62 and is drivingly coupled to the drive means 30. Drive means 30 comprises a gear motor 108 mounted above the cover 62 on a pedestal 110. Cam means 112 carried on the upper end of the drive shaft 102 is engageable with a switch 114 which controls the rotation of the drive shaft 102 in a manner which will be subsequently described in greater detail.

As best seen in FIGS. 4 and 7, each side edge of the partition member 28 is formed with a vertical groove 116. A retainer member 118 is mounted in each of the grooves 116 and has a vane seating groove 120 in which a pair of vanes 122 and 124 are disposed. The vanes 122 and 124 are biased outwardly by spring means 128 so that their outer edges sealingly engage a partially cylindrical sidewall portion 130 of the housing 60 which forms a part of the sidewall of the internal chamber 26. The cylindrical sidewall portions 130 are formed about the axis of rotation of the partition 28. As best seen in FIG. 7, the vanes 122 and 124 are loosely fitted in their grooves 120 so that they tip from side-to-side as the partition 28 rotates in order to release any dirt which they may collect as the partition is rotated between its alternate positions. The two vanes are attached to the retainer 118 by a pin 132. The vane 124 is of rubber and the vane 122 is of metal.

The retainer 118 has a passage 134 connected to a pair of short passages 136 and 138 in the partition 28. The passage 136 provides a fluid connection between the passage 134 and the filtering chamber 32 while the passage 138 provides a fluid connection between the passage 134 and the cleaning chamber 34. A ball 140 is disposed in the passage 134 and moves between opposite ends of the passage 134 depending on the pressure differential existing between the cleaning chamber 34 and the filtering chamber 32. A short passage 142 connects the passage 134 to the vane seating groove 120 so that the pressure existing within the passage 134 is reflected in the groove 120 and behind the vanes. The two vanes 122 and 124 are formed with a pair of opposed grooves 144 on their face-to-face surfaces so that the grooves 144 reflect pressure changes in the passage 134 at the outer tips of the vanes 122 and 124. Thus the ball 140 acts as a valve which assumes a position dependent on the chamber having the greater fluid pressure. The vanes 122 and 124 are essentially pressure balanced by the pressure existing behind the two vanes in the groove 120 which always reflects the pressure in the chamber having the greater pressure as the valve moves back and forth in response to changes in the pressure differential existing between the filtering chamber 32 and the cleaning chamber 34.

Now referring to FIGS. 3, 4, and 7, each of the filter elements 36 and 38 is in the form of a cartridge which can be easily removed through the side cover 64. Each filter element comprises an outer perforated generally semicylindrical shell section 146, an inner generally semicylindrical section 148 and a removable mesh element 150 having a generally pleated configuration. The outer shell 146 is joined to the inner shell 148 with the mesh element 150 being disposed in a housing formed by the two shell elements. The mesh element 150 is attached by an elongated clip element 152 having a J-shaped cross section and attached to the side edge of the mesh element 150, a second elongated clip 154 having a J-shaped cross section fixedly attached to the inner shell 148 and an elongated retainer clip 156 having a C-shaped cross section which is joined to the clips 152 and 154 by a sliding motion in a direction parallel to their longitudinal edges. The filter element 36 and the filter element 38 are similar to one another and each attached by threaded fasteners 158 to the retainer 118. Thus each filter element can be removed through the access opening provided by removal of cover 64 and the mesh element 150 separated from the two shell sections by disengaging the clip means 156 from the two clips 152 and 154. The mesh element 150 can then be expanded, cleaned and then quickly and easily reinstalled between the shell elements 146 and 148.

Figure 9:
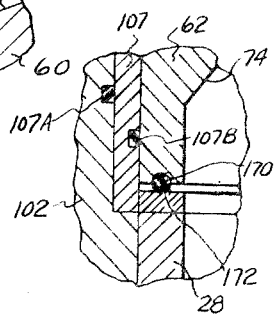
FIG. 9 is an enlarged sectional view showing a portion of the upper wear plate in the internal chamber.
Figure 10:
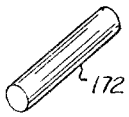
FIG. 10 is a perspective view showing the sealing element separated from the cover and the upper wear plate.

Referring to FIGS. 3, 9 and 10, each filter element is sandwiched between an upper ring segment 160 and a lower ring segment 162. The lower ring segment 162 rides on a lower wear plate 164 mounted in the bottom of the internal chamber 26. An upper wear plate 166 is disposed between the cover 62 and the two filter elements. The wear plate 166 is fixed against rotation by a pin (not shown) and biased down against the filter elements by spring means 168. The downward bias of the spring means is assisted by a clearance between the circumferential edge of the wear plate 166 and the housing 62 as at 168A and a clearance between the upper surface wear plate 166 and the housing 62 as at 168B that allows fluid pressure from within the chamber to act downwardly on the wear plate.

The housing 62 has an elongated groove 170 above the wear plate 166. An elongated sealing element 172 is seated in the groove 170 and provides a fluid seal between the chambers 32 and 34 whenever the partition means 28 is in one of its rotated positions.

Referring to FIGS. 4 and 6, sensing means 40 detect a fluid pressure change occurring at the inlet 16 caused by the filter element in the filtering chamber 32 assuming a clogged condition. Sensing means 40 comprises a substantially cylindrical chamber 174 having an opening 176 adjacent the inlet 16 and another opening 178 (best seen in FIG. 1) which connects with the outlet 18. A cap 180 is mounted at one end of the chamber 174 and supports an inwardly directed guide rod 182 which extends toward the opening 176. A cup-shaped piston member 184 is sealingly slidably mounted on the rod 182 in the opening 176. Thus the outer surface of the piston 184 is exposed to the pressure in the inlet 16 and the inner surface of the piston 184 is exposed to the pressure at the outlet 18 so that the piston moves to positions corresponding to the pressure differential between the inlet and outlet.

The rod 182 has an enlarged end 186 which limits the motion of the piston 184 away from the cap 180. A spring 188 in the chamber 174 biases the piston 184 away from the cap 180 and is chosen of a selected strength so that the piston commences to move when a predetermined pressure differential is created across the inlet by a clogged filter element.

A piston 184 has a slotted pilot portion 190 bearing against a crank arm 192 having a regular longitudinal twist. The crank arm 192 is supported for rotation about its longitudinal axis on the inner end of a shaft 194 which is journaled in the cap 180 and extends exteriorly of the cap 180. As best seen in FIG. 6 the outer end of the shaft 194 carries a cam 196 and a pointer 198. As the piston 184 is moved by the changing pressure differential against the bias of the spring 188, the pilot portion 190 causes the crank arm 192 and the shaft 194 to rotate thereby causing the pointer to traverse a legend plate 200 mounted on the cap 180. The pointer 198 and the legend plate 200 cooperate to visually indicate the filtering condition of the filter element disposed in the filtering chamber 32.

A normally open plunger type switch 202 is mounted on the cap 180 and arranged such that when the cam 196 rotates clockwise as the filter element disposed in the filtering chamber 32 becomes clogged, the switch 202 energizes the gear motor 108 which commences to rotate the drive shaft 102.

Referring to FIGS. 1 and 8, the preferred electrical circuit shows that the switches 202 and 114 are connected in series with the motor 108 and the coil 204 of the starter relay for the motor 108. Normally open contacts 206 of the starter relay coil shut the switch 202. The normally open switch 202 is closed upon an increased pressure differential across the filter element disposed in the filtering chamber 32 so that the relay coil 204 becomes energized which in turn energizes the motor 108, locks in the contacts 206 and closes a normally opened solenoid switch which is adapted to close the valve 56 in the backwash conduit 48.

As the drive shaft 102 commences to rotate, the clean filter element in the cleaning chamber 34 is rotated into the filtering chamber 32 with the pressure differential returning to its normal level so that the switch 202 resumes its normally opened condition. The cam 112 carried by the drive shaft engages the normally closed switch 114 to momentarily move it to an opened position and thus deenergize the motor 108, the relay 206 and the solenoid switch 208. As the motor 108, through inertia, moves one of a pair of lobes of the cam 112 past the switch 114 so that it again assumes its closed condition, the circuit remains open until the next cycle is initiated by a change in the pressure differential across the filter element in the filtering chamber 32. A solenoid valve 210 is then triggered to introduce pressurized fluid, such as compressed air, from the source 96 behind the piston 46. It is to be understood that the electrical circuit is described in its simplest terms and is for illustrative purposes only, and that it would be obvious to one skilled in the art that a variety of electrical circuits could be used to perform the aforementioned sequence of operations.

It is to be understood that I have described an improved fluid system having a self-cleaning filtering device for cleaning the coolant supplied to a machine tool with pressure actuated means for automatically exchanging the clogged filter with a clean filter. The preferred filter device employs pressure balance vane means for sealing the two chambers one from the other. The filter element exchange occurs without interrupting the flow of fluid being delivered to the machine. Each filter element can be readily removed from the housing.

Although I have described but one embodiment of my invention, it is to be understood that various changes and revisions can be made therein without departing from the spirit of the invention as expressed in the scope of the appended claims.

Having thus described my invention, I claim:

1. In a fluid device having internal walls defining an internal fluid chamber, a partition member in said internal chamber arranged to subdivide said internal chamber into a pair of separated chamber sections, one on each side of said partition member, means for introducing fluid into each of said chamber sections of differing magnitudes of pressure so that a pressure differential exists across said partition member, vane means mounted on said partition member for engaging the walls of said internal chamber to form a fluid seal between said chamber sections, said vane means having pressure responsive surfaces, passage means in said partition member for fluidly connecting said chamber sections with the pressure responsive surfaces of said vane means, and valve means in said passage means for opening communications between said responsive surfaces and the chamber section having the greater fluid pressure and closing communication between said pressure responsive surfaces and the chamber section having the lesser fluid pressure.

2. A system as defined in claim 1, wherein said partition member is supported for rotation, and said internal chamber has cylindrical wall portions formed about the axis of rotation of said partition member and engageable with said vane means.

3. A system as defined in claim 1, wherein said partition member has groove means for mounting said vane means and said passage means comprises a passage through said partition member having its opposite ends opening into the chamber sections on opposite sides of said partition member and an intermediate section connected with said groove means and said valve means comprises a ball in said passage with opposite sides exposed to the fluid pressure in the chamber sections on the opposite sides of said partition member so that said ball moves in said passage in a direction toward the chamber section with the lesser fluid pressure to a position opening fluid communication between said groove means and the chamber section with the greater fluid pressure so that the fluid from the chamber section with the greater pressure acts behind said vane members to resiliently urge them in sealing engagement against the walls of said internal chamber.

4. A filter cartridge comprising:
  a. an outer fluid pervious shell having a partially cylindrical cross section;
  b. an inner fluid pervious shell having a partially cylindrical cross section;
  c. means joining the side edges of said outer and inner shells so that the convex side of said inner shell confronts the concave side of the outer shell to form a housing for a filter element;
  d. a flexible filter element disposed in said housing; and
  e. clip means in said housing for releasably mounting said filter element in said housing.

5. A filter cartridge as defined in claim 4, wherein said clip means comprises a pair of elongated clips, each having a generally J-shaped cross section, one of said J-shaped clips being attached to the edge of said filter element and the second of said pair of J-shaped clips being attached to said housing and including an elongated retainer clip having a C-shaped cross section for interengaging each pair of said J-shaped clips.

* * * * *